US009942456B2

(12) United States Patent
Okamoto

(10) Patent No.: US 9,942,456 B2
(45) Date of Patent: Apr. 10, 2018

(54) INFORMATION PROCESSING TO AUTOMATICALLY SPECIFY AND CONTROL A DEVICE

(71) Applicant: SONY CORPORATION, Tokyo (JP)

(72) Inventor: Keiji Okamoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/574,669

(22) Filed: Dec. 18, 2014

(65) Prior Publication Data

US 2015/0189152 A1 Jul. 2, 2015

(30) Foreign Application Priority Data

Dec. 27, 2013 (JP) ................................. 2013-273371

(51) Int. Cl.
*H04N 5/232* (2006.01)

(52) U.S. Cl.
CPC ............... *H04N 5/23206* (2013.01)

(58) Field of Classification Search
CPC ........... H04N 5/23206; H04N 5/23203; H04N 5/247; H04N 5/335; H04N 5/23238; H04N 7/181; H04N 7/15; H04N 7/142; H04N 7/0018; H04N 1/00965; H04N 21/4184; H04N 21/4424; H04N 21/4435; H04M 11/025; H04M 2250/22; G08B 13/19645; G08B 13/19693; G08B 13/19641; G08B 13/19673; G08B 13/19695
USPC ................................................... 348/207.11
See application file for complete search history.

(56) References Cited

U.S. PATENT DOCUMENTS

| 6,359,647 | B1 * | 3/2002 | Sengupta | ......... G08B 13/19608 348/143 |
| 6,393,216 | B1 * | 5/2002 | Ootsuka | ................. G03B 17/00 396/296 |
| 8,340,654 | B2 * | 12/2012 | Bratton | ................... H04N 5/232 348/211.11 |
| 8,405,702 | B1 * | 3/2013 | Gottlieb | ................... H04N 7/15 348/14.08 |
| 8,471,910 | B2 * | 6/2013 | Cleary | ............. G08B 13/19608 348/159 |
| 8,570,286 | B2 * | 10/2013 | Laberge | ................ G06F 3/0481 345/156 |
| 8,879,886 | B2 * | 11/2014 | de Klerk | .................. H04N 5/76 386/223 |
| 9,167,171 | B2 * | 10/2015 | Muraki | ................ H04N 5/2353 |
| 9,401,937 | B1 * | 7/2016 | Gottlieb | ................ H04L 65/403 |
| 9,538,121 | B2 * | 1/2017 | Saijo | ......................... H04N 5/77 |
| 9,571,797 | B2 * | 2/2017 | Kanehira | ........... G06K 9/00771 |
| 2001/0043279 | A1 * | 11/2001 | Niikawa | ................ H04N 5/232 348/335 |

(Continued)

FOREIGN PATENT DOCUMENTS

| JP | 2001-326845 A | 11/2001 |
| JP | 2012-119846 A | 6/2012 |

*Primary Examiner* — Pritham Prabhakher
(74) *Attorney, Agent, or Firm* — Chip Law Group

(57) ABSTRACT

There is provided an information processing device including an acquisition unit configured to acquire operation state information of connected imaging devices, and an operation instruction unit configured to give an operation instruction to the imaging device specified based on the operation state information of the imaging devices acquired by the acquisition unit.

16 Claims, 11 Drawing Sheets

(56) References Cited

U.S. PATENT DOCUMENTS

| | | | | |
|---|---|---|---|---|
| 2003/0067543 A1* | 4/2003 | Okada | H04N 7/181 | 348/207.1 |
| 2004/0085456 A1* | 5/2004 | Kwag | H04N 7/142 | 348/211.11 |
| 2004/0105450 A1* | 6/2004 | Ikuta | H04L 29/06 | 370/401 |
| 2006/0192675 A1* | 8/2006 | Renkis | G08B 13/19615 | 340/540 |
| 2007/0132849 A1* | 6/2007 | Hill | G08B 13/19636 | 348/159 |
| 2008/0039052 A1* | 2/2008 | Knowles | H04L 51/38 | 455/412.1 |
| 2008/0106601 A1* | 5/2008 | Matsuda | H04N 5/23293 | 348/175 |
| 2008/0288986 A1* | 11/2008 | Foster | G08B 13/19656 | 725/62 |
| 2009/0040289 A1* | 2/2009 | Hetherington | H04N 7/142 | 348/14.12 |
| 2009/0249244 A1* | 10/2009 | Robinson | G06F 3/0481 | 715/781 |
| 2009/0295925 A1* | 12/2009 | Miyamaki | H04N 1/00286 | 348/159 |
| 2010/0118162 A1* | 5/2010 | Saijo | H04N 5/23203 | 348/231.6 |
| 2010/0208941 A1* | 8/2010 | Broaddus | G01S 3/7864 | 382/103 |
| 2010/0284680 A1* | 11/2010 | Higaki | G03B 17/24 | 396/310 |
| 2010/0304731 A1* | 12/2010 | Bratton | H04N 5/232 | 455/420 |
| 2011/0119716 A1* | 5/2011 | Coleman, Sr. | H04N 7/181 | 725/62 |
| 2011/0142233 A1* | 6/2011 | Kim | H04N 7/181 | 380/200 |
| 2011/0193966 A1* | 8/2011 | Golan | H04N 7/181 | 348/159 |
| 2011/0254958 A1* | 10/2011 | Kotani | G06T 15/205 | 348/159 |
| 2012/0069201 A1* | 3/2012 | Kuroiwa | H04N 1/2112 | 348/207.2 |
| 2012/0272293 A1* | 10/2012 | Jankowski | G06F 9/54 | 726/4 |
| 2013/0166718 A1* | 6/2013 | Okuyama | H04L 67/24 | 709/223 |
| 2013/0307919 A1* | 11/2013 | Taubin | H04N 7/15 | 348/14.02 |
| 2014/0002664 A1* | 1/2014 | Hanabusa | H04N 7/181 | 348/159 |
| 2014/0176665 A1* | 6/2014 | Gottlieb | H04N 7/15 | 348/14.08 |
| 2014/0320608 A1* | 10/2014 | Muukki | G06F 13/4282 | 348/47 |
| 2014/0340510 A1* | 11/2014 | Ihlenburg | H04N 7/18 | 348/118 |
| 2015/0085132 A1* | 3/2015 | Bekiares | H04N 7/0806 | 348/159 |
| 2015/0116501 A1* | 4/2015 | McCoy | G06T 7/2093 | 348/169 |

* cited by examiner

FIG.3

| IMAGING DEVICE | OPERATION MODE | PROCESS EXECUTION STATE |
|---|---|---|
| CAMERA A | MOVING IMAGE MODE | DURING RECORDING |
| CAMERA B | STILL IMAGE MODE | DURING WAITING |
| CAMERA C | MOVING IMAGE MODE | DURING RECORDING |

FIG.7
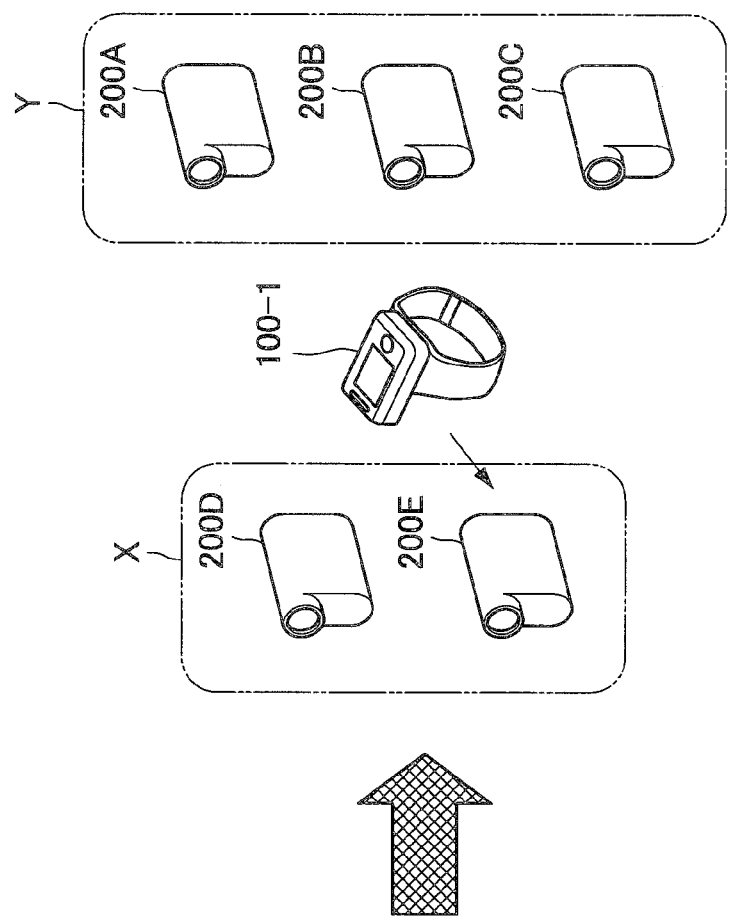
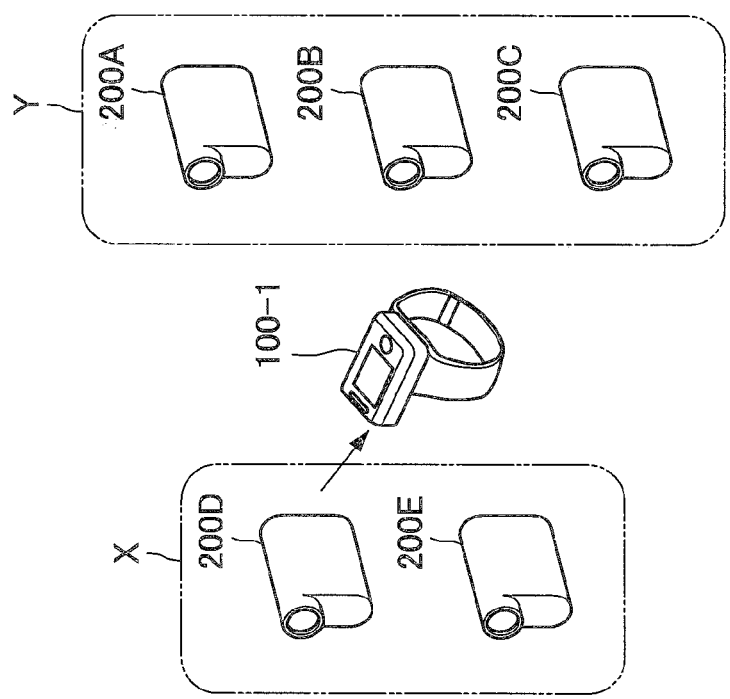

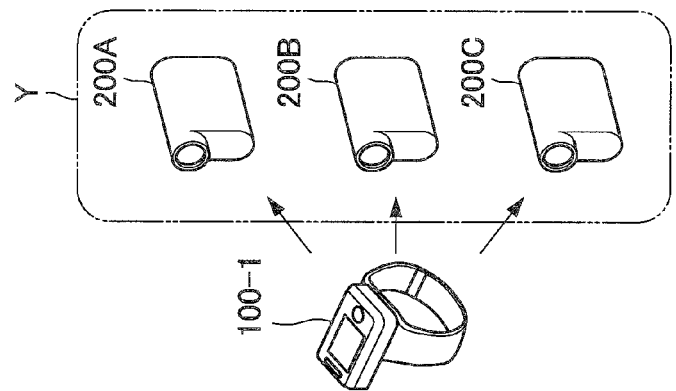
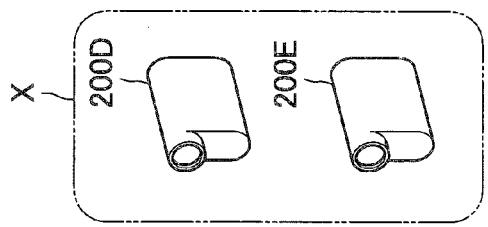
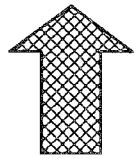
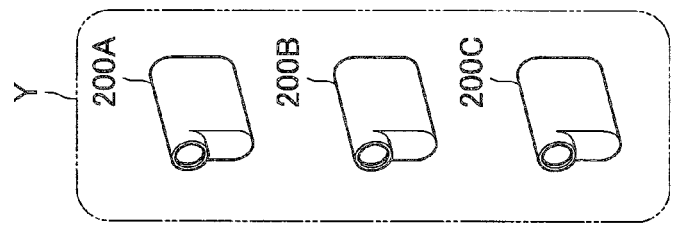
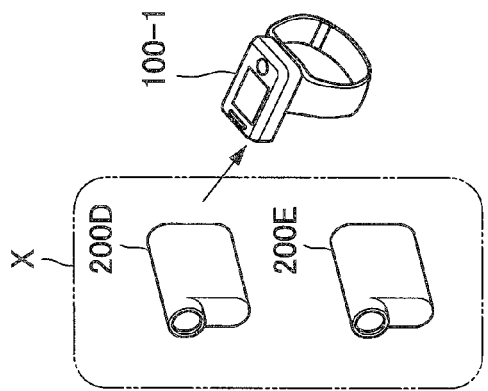
FIG.8

INFORMATION PROCESSING TO AUTOMATICALLY SPECIFY AND CONTROL A DEVICE

CROSS REFERENCE TO RELATED APPLICATIONS

This application claims the benefit of Japanese Priority Patent Application JP 2013-273371 filed Dec. 27, 2013, the entire contents of which are incorporated herein by reference.

BACKGROUND

The present disclosure relates to an information processing device, an information processing system, an information processing method, and a program.

In recent years, products in which communication technologies are applied to imaging devices such as digital cameras have generally been distributed. Operations of the imaging devices can be controlled through communication from external information processing devices or the like.

For example, JP 2001-326845A discloses that the operations of a plurality of imaging devices are controlled using one remote controller.

JP 2012-119846A discloses that a plurality of imaging devices are connected mutually through communication and a notification from one imaging device is received by the other imaging devices which operate based on the notification.

SUMMARY

In the disclosure of JP 2001-326845A and JP 2012-119846A, however, it is difficult to automatically specify an imaging device which is a communication partner.

For example, JP 2001-326845A discloses a configuration in which a user selects an imaging device controlled by a remote controller and automatic selection of an imaging device is not assumed.

In the disclosure of JP 2012-119846A, since one imaging device is configured to transmit a notification to all of the other connected imaging devices, it is difficult to transmit the notification selectively to the other imaging devices.

It is desirable to provide a novel and improved information processing device, a novel and improved information processing system, a novel and improved information processing method, and a novel and improved program capable of automatically specifying an imaging device to be controlled.

According to an embodiment of the present disclosure, there is provided an information processing device including an acquisition unit configured to acquire operation state information of connected imaging devices, and an operation instruction unit configured to give an operation instruction to the imaging device specified based on the operation state information of the imaging devices acquired by the acquisition unit.

According to an embodiment of the present disclosure, there is provided an information processing system including imaging devices each configured to include an imaging unit, and a communication unit that transmits operation state information, and an information processing device configured to include a communication unit that receives the operation state information of the connected imaging devices, and an operation instruction unit that gives an operation instruction, through the communication unit, to the imaging device specified based on the operation state information of the imaging devices received by the communication unit. The imaging device controls the imaging unit based on the operation instruction from the information processing device.

According to an embodiment of the present disclosure, there is provided an information processing method including acquiring operation state information of connected imaging devices, and giving an operation instruction to the imaging device specified based on the acquired operation state information of the imaging devices.

According to an embodiment of the present disclosure, there is provided a program causing a computer to realize an acquisition function of acquiring operation state information of connected imaging devices, and an operation instruction function of giving an operation instruction to the imaging device specified based on the operation state information of the imaging devices acquired by the acquisition function.

According to embodiments of the present disclosure described above, there are provided an information processing device, an information processing system, an information processing method, and a program capable of automatically selecting an imaging device to be controlled. The foregoing advantageous effects are not necessarily restrictive, but any advantageous effect desired to be obtained in the present specification or other advantageous effects understood from the present specification may be obtained along with the foregoing advantageous effects or instead of the foregoing advantageous effects.

BRIEF DESCRIPTION OF THE DRAWINGS

FIG. 3 is a diagram illustrating an example of operation state information of the imaging devices stored in a storage unit of the information processing device according to the first embodiment;

FIG. 7 is a diagram for describing an example of an operation instruction given inside a group of the imaging devices of the information processing device according to a fourth modification example of the first embodiment;

FIG. 8 is a diagram for describing an example of an operation instruction performed across groups of the imaging devices of the information processing device according to a fourth modification example of the first embodiment;

DETAILED DESCRIPTION OF THE EMBODIMENTS

Figure 1:
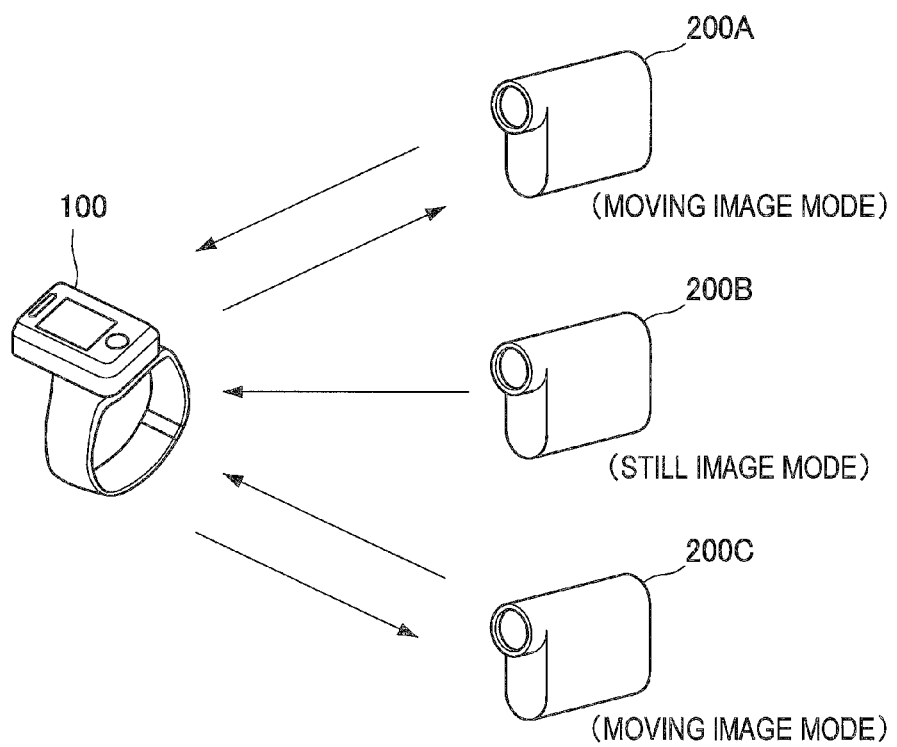
FIG. 1 is a diagram for describing an overview of an information processing device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order:

1. Overview of information processing device according to embodiment of the present disclosure
2. First embodiment of the present disclosure (example in which operation instruction is given based on operation state of imaging device)
   2-1. Configuration of information processing device according to embodiment
   2-2. Process of information processing device according to embodiment
   2-3. Modification examples of embodiment
3. Second embodiment of the present disclosure (example in which imaging device serving as starting point of operation instruction is set)
   3-1. Configuration of information processing device according to embodiment
   3-2. Process of information processing device according to embodiment
   3-3. Modification examples of embodiment
4. Hardware configuration of information processing device according to embodiment of the present disclosure
5. Conclusion

1. OVERVIEW OF INFORMATION PROCESSING DEVICE ACCORDING TO EMBODIMENT OF THE PRESENT DISCLOSURE

First, an overview of an information processing device according to an embodiment of the present disclosure will be described with reference to FIG. 1. FIG. 1 is a diagram for describing the overview of the information processing device according to the embodiment of the present disclosure.

An information processing device 100 illustrated in FIG. 1 is a handheld portable communication terminal which is carried by a user and performs communication connection with a plurality of imaging devices 200. The information processing device 100 has a function of concurrently performing operation control of the plurality of imaging devices 200. Therefore, the information processing device 100 can concurrently control the operations of the plurality of imaging devices 200 through communication.

For example, as illustrated in FIG. 1, the information processing device 100 performs communication connection with the imaging devices 200A to 200C and can perform operation control of each of the imaging devices 200A to 200C, e.g., execution of an imaging process, through communication.

Here, when each of the imaging devices 200 connected to the information processing device 100 is uniformly controlled, the control of some of the imaging devices 200 is not appropriate for the states of the imaging devices 200, and thus there is a probability of communication resources related to this control being wasted or erroneous operations or the like occurring in the imaging devices 200 under this control. On the other hand, when the imaging devices 200 to be controlled are allowed to be selected by users, the users have to select the imaging devices 200 to be controlled whenever a control request is made, and thus there is a probability of convenience for the users deteriorating. Accordingly, the information processing device 100 acquires operation state information of the imaging devices 200 and gives an operation instruction to the imaging devices 200 specified based on the acquired operation state information.

For example, as illustrated in FIG. 1, the information processing device 100 can first acquire the operation state information from each of the connected imaging devices 200A to 200C, e.g., operation modes.

Next, for example, when the operation mode related to the operation instruction is a moving image mode, the information processing device 100 specifies the imaging devices 200A and 200C of which the operation mode is the moving image mode and gives the operation instruction to the specified imaging devices 200A and 200C.

In this way, the information processing device 100 according to an embodiment of the present disclosure acquires the operation state information of the imaging devices 200 and gives the operation instruction of the imaging devices 200 specified based on the acquired operation state information. Therefore, by automatically selecting the imaging devices 200 to be controlled and receiving the operation instruction, it is possible to improve convenience for the users. In FIG. 1, a remote controller with a display unit is illustrated as an example of the information processing device 100, but the information processing device 100 may be a portable communication terminal such as a smartphone, a tablet terminal, a digital camera, a portable game device, or a personal digital assistant (PDA). To facilitate the description, the information processing devices 100 in first and second embodiments are distinguished from each other by suffixing numbers corresponding to the embodiments, as in an information processing device 100-1 and an information processing device 100-2.

2. FIRST EMBODIMENT OF THE PRESENT DISCLOSURE

Example in which Operation Instruction is Given Based on Operation State of Imaging Device The overview of the information processing device 100 according to an embodiment of the present disclosure has been described above. Next, the information processing device 100-1 according to the first embodiment of the present disclosure will be described. The information processing device 100-1 according to the embodiment gives an operation instruction to the imaging devices 200 specified based on the operation state information of the imaging devices 200.

2-1. Configuration of Information Processing Device According to Embodiment

Figure 2:
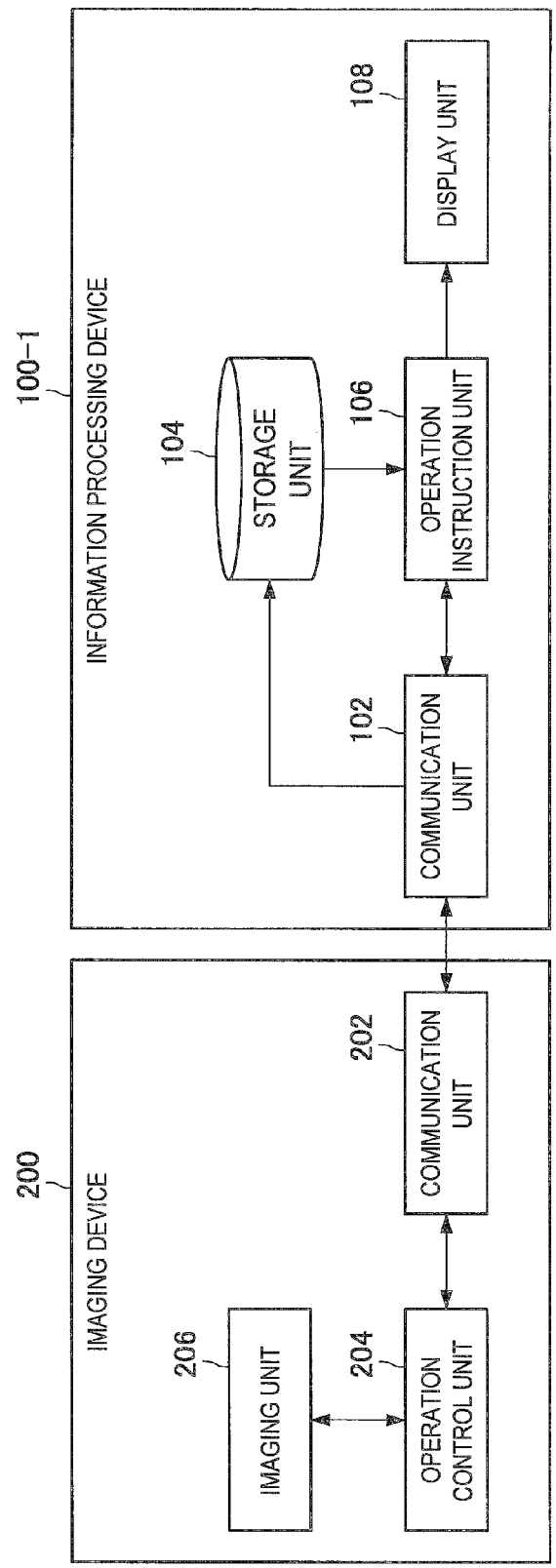
FIG. 2 is a block diagram illustrating overall functional configurations of the information processing device and an imaging device according to a first embodiment of the present disclosure.

First, the configurations of the information processing device 100-1 and the imaging device 200 according to the first embodiment of the present disclosure will be described with reference to FIG. 2. FIG. 2 is a block diagram illustrating overall functional configurations of the information processing device 100-1 and the imaging device 200 according to the first embodiment of the present disclosure.

As illustrated in FIG. 2, the information processing device 100-1 includes a communication unit 102, a storage unit 104, an operation instruction unit 106, and a display unit 108.

The communication unit 102 functions as an example of an acquisition unit and performs communication with the imaging devices 200. Specifically, the communication unit 102 receives the operation state information of the imaging devices 200 and image data obtained through imaging of the imaging devices 200 and transmits the operation instruction to the imaging devices 200. The communication unit 102 stores the received operation state information of the imaging devices 200 in the storage unit 104. For example, the communication unit 102 can perform wireless communication using WiFi (registered trademark), Bluetooth (registered trademark), Zigbee (registered trademark), or the like.

The storage unit 104 stores the operation state information of the imaging devices 200. For example, the operation state information of the imaging devices 200 stored in the storage unit 104 will be described with reference to FIG. 3. FIG. 3 is a diagram illustrating an example of the operation state information of the imaging devices 200 stored in the storage unit 104 of the information processing device 100-1 according to the embodiment. As illustrated in FIG. 3, the operation state information of the imaging devices 200 can include information (hereinafter also referred to as operation mode information) indicating an operation mode and information (hereinafter also referred to process execution state information) indicating a process execution state. The operation mode is, for example, a moving image mode in which a moving image is photographed and a still image mode in which a still image is photographed, and the process execution state can be, for example, states during recording or waiting of a moving image or the like. As illustrated in FIG. 3, the storage unit 104 can retain the operation mode information and the process execution state information regarding each of the imaging devices 200. For example, the storage unit 104 can store the fact that the operation mode of a camera A which is the imaging device 200 is the moving image mode and the process execution state of the camera A is the state during recording.

Here, referring back to FIG. 2 to describe the configuration of the information processing device 100-1, the operation instruction unit 106 generates an operation instruction for the imaging devices 200. Specifically, when the operation state of the imaging device 200 received by the communication unit 102 is changed, the operation instruction unit 106 specifies the imaging device 200 to which the operation instruction is given based on the operation state information of the imaging device 200.

Figure 4:
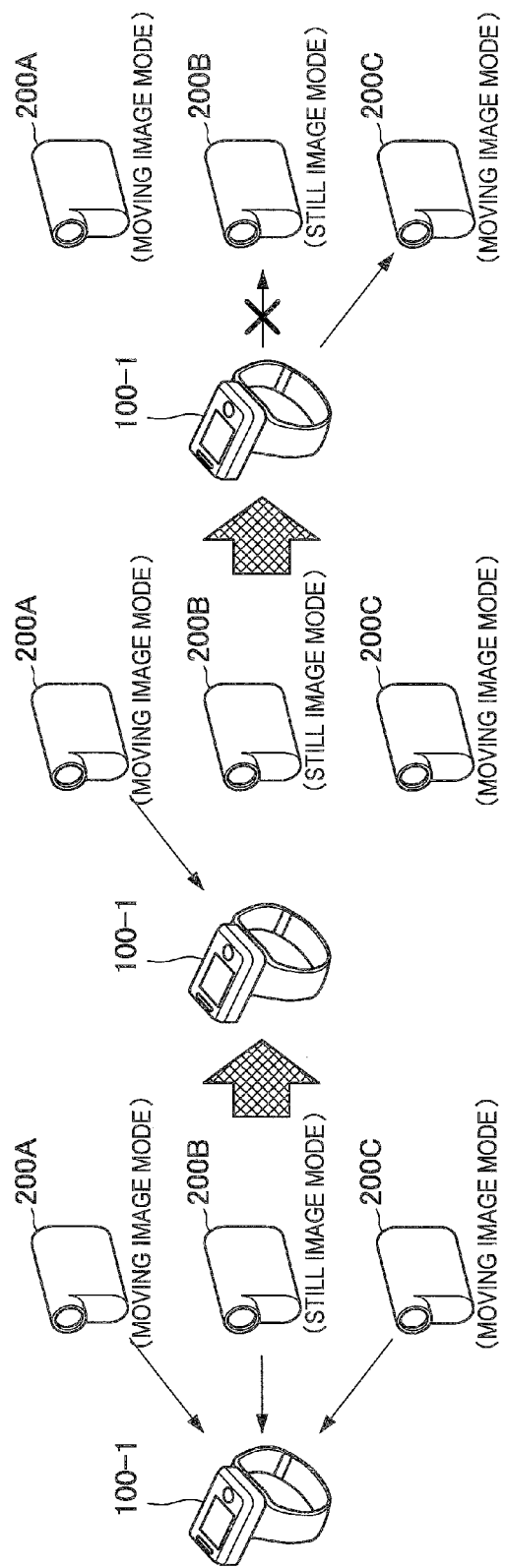
FIG. 4 is a diagram illustrating an example of an operation of the information processing device according to the first embodiment.

More specifically, when the process execution state included in the operation state information of the imaging device 200 received by the communication unit 102 is changed, the operation instruction unit 106 generates the operation instruction of the imaging device 200 which is in the operation mode related to the operation mode indicated by the operation state information of this imaging device 200. The operation instruction to the imaging device 200 is an operation instruction to shift the process execution state of the imaging device 200 different from the imaging device 200 of which the process execution state is changed to the changed process execution state of the imaging device 200 of which the process execution state is changed. For example, an operation of the operation instruction unit 106 will be described with reference to FIG. 4. FIG. 4 is a diagram illustrating an example of the operation of the information processing device 100-1 according to the first embodiment.

As illustrated in FIG. 4, the information processing device 100-1 first acquires the operation mode information and the process execution state information from the imaging device 200. For example, as illustrated in the left drawing of FIG. 4, the communication unit 102 can acquire the operation mode information and the process execution state information from the imaging devices 200A to 200C through communication. Then, the communication unit 102 can cause the storage unit 104 to store the acquired operation mode information. As illustrated in the left drawing of FIG. 4, the operation modes of the imaging devices 200A and 200C are the moving image mode and the operation mode of the imaging device 200B is the still image mode.

Next, the information processing device 100-1 further acquires the process execution state information from the imaging devices 200 and determines whether the process execution states are changed. For example, as illustrated in the middle drawing of FIG. 4, the communication unit 102 can further acquire the process execution state information from the imaging device 200A. Then, the operation instruction unit 106 can compare the acquired process execution state of the imaging device 200A to the process execution state of the imaging device 200A stored in the storage unit 104 and determine whether the process execution state is changed.

When it is determined that the operation state of the imaging device 200 is changed, the information processing device 100-1 generates a state shift instruction to shift to the changed process execution state of the imaging device 200 of which the process execution state is changed and gives an operation instruction to the imaging device 200 in an operation mode related to the operation mode of the imaging device 200 of which the process execution state is changed. For example, when it is determined that the process execution state of the imaging device 200A is changed from the state during waiting to the state during recording, the operation instruction unit 106 generates an operation instruction to shift the process execution state to the state during the recording. As illustrated in the right drawing of FIG. 4, the operation instruction unit 106 can cause the communication unit 102 to transmit the generated operation instruction to the imaging device 200C of which the operation mode is the moving image mode which is the same as the operation mode of the imaging device 200A. Since the operation mode of the imaging device 200B is the still image mode, the operation instruction unit 106 causes the communication unit 102 not to transmit the generated operation instruction. The operation instruction unit 106 may not give the operation instruction to the imaging device 200 in the same process execution state as the process execution state to be shifted. The example in which the operation instruction unit 106 gives the operation instruction to the imaging devices 200 of which the operation modes are the same has been described above. For example, when the process execution state of the imaging device 200 in the still image mode is changed to the state during recording, the operation instruction unit 106 may give an operation instruction to shift the process execution state to the state during recording to the imaging device 200 in an interval still image mode.

In this way, when the operation state of the imaging device 200 received by the communication unit 102 is changed, the operation instruction unit 106 specifies the imaging device 200 to which the operation instruction is given based on the operation state information of this imaging device 200. Therefore, when the operation state of one image device 200 is changed, a trouble of a user's manipulation can be reduced by giving the operation instruction to another imaging device 200.

When the process execution state of the imaging device 200 is changed, the operation instruction unit 106 generates an operation instruction for the imaging device 200 in the operation mode related to the operation mode of this imaging device 200. Therefore, by giving no operation instruction to the imaging device 200 in the unrelated operation mode, it is possible to reduce a communication amount, a processing load, and the like related to the operation instruction.

The operation instruction unit 106 gives a state shift instruction to shift to the changed process execution state of the imaging device 200 of which the process execution state is changed, to the imaging device 200 different from the imaging device 200 of which the process execution state is changed. Therefore, by automatically performing the state shift, it is possible to omit a manipulation or the like of designating a user's shift destination state, and thus it is possible to improve convenience.

The example in which the operation instruction is the state shift instruction of the process execution state has been described above, but the operation instruction may be a setting change instruction of the operation mode or the like. For example, the operation instruction can be an instruction to change setting of the operation mode, image quality, exposure control, or the like. Therefore, by performing the control of the imaging devices 200 extensively, it is possible to improve the convenience for the user.

Here, referring back to FIG. 2 to describe the configuration of the information processing device 100-1, the display unit 108 displays the operation state, an image, and the like received from the imaging device 200. For example, the display unit 108 can be a liquid crystal panel, an organic electro-luminescence (EL), or the like. As illustrated in FIG. 2, the imaging device 200 includes a communication unit 202, an operation control unit 204, and an imaging unit 206.

The communication unit 202 performs communication with the information processing device 100-1. Specifically, the communication unit 202 transmits operation state information of the imaging device 200, such as an image obtained through imaging of the imaging unit 206, to the information processing device 100-1 and receives an operation instruction from the information processing device 100-1.

The operation control unit 204 controls an operation of the imaging device 200 according to the operation instruction received from the information processing device 100-1. Specifically, the operation control unit 204 changes setting of the operation mode or the like of the imaging device 200 and controls the operation of the imaging unit 206 according to the setting.

The imaging unit 206 performs imaging based on a control instruction by the operation control unit 204. For example, the imaging unit 206 can include an imaging optical system such as a zoom lens and a photographing lens condensing light and a signal conversion element such as a charge coupled device (CCD) or a complementary metal oxide semiconductor (CMOS).

2-2. Process of Information Processing Device According to Embodiment

Figure 5:
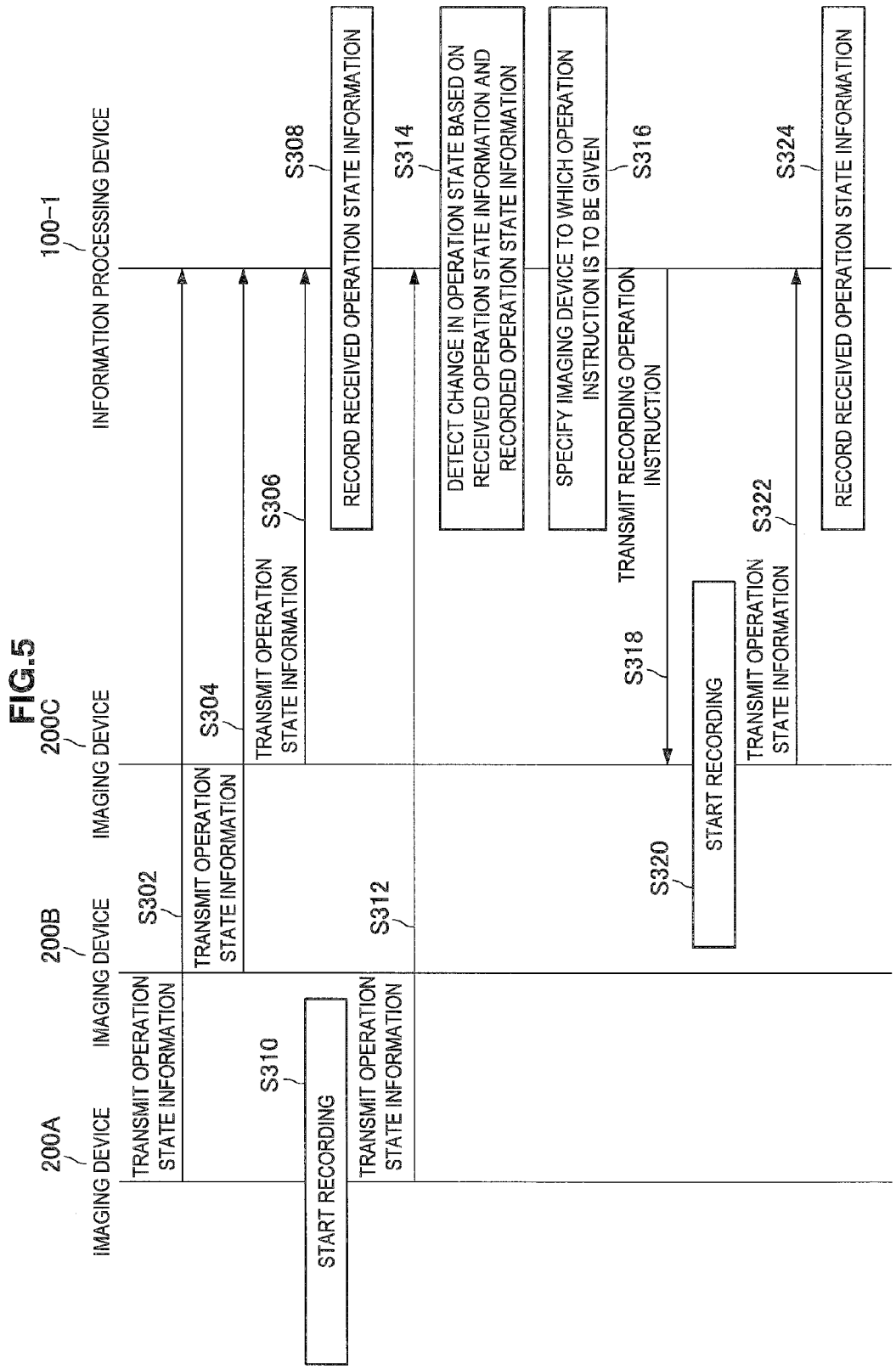
FIG. 5 is a sequence diagram conceptually illustrating processes of the information processing device and the imaging devices according to the first embodiment.

Next, the process of the information processing device 100-1 according to the embodiment will be described with reference to FIG. 5. FIG. 5 is a sequence diagram conceptually illustrating processes of the information processing device 100-1 and the imaging devices 200 according to the first embodiment.

First, the imaging devices 200A, 200B, and 200C transmit the operation state information to the information processing device 100-1 (steps S302 to S306). Specifically, when the presence of the information processing device 100-1 is detected by the communication unit 202, the operation control unit 204 causes the communication unit 202 to transmit the operation state information including the operation mode information and the process execution state information to the information processing device 100-1.

Next, the information processing device 100-1 records the received operation state information (step S308). Specifically, the communication unit 102 receives the operation state information transmitted by the imaging devices 200A to 200C and causes the storage unit 104 to store the received operation state information.

Next, the imaging device 200A starts recording (step S310). Specifically, the operation control unit 204 shifts the process execution state of the imaging device 200A to the state during recording and causes the imaging unit 206 to start imaging based on a user's manipulation or the like on the imaging device 200A.

Next, the imaging device 200A transmits the operation state information to the information processing device 100-1 (step S312). Specifically, the operation control unit 204 causes the communication unit 202 to transmit the operation state information including the process execution state information indicating that recording is being performed to the information processing device 100-1.

Next, the information processing device 100-1 detects a change in the operation state based on the received operation state information and the recorded operation state information (step S314). Specifically, the operation instruction unit 106 determines whether there is a difference between the process execution state indicated by the process execution state information included in the operation state information received from the imaging device 200A and the process execution state indicated by the operation state information of the imaging device 200A stored in the storage unit 104, and detects the change in the operation state of the imaging device 200A.

When the change in the operation state is detected in step S314, the information processing device 100-1 specifies the imaging device to which the operation instruction is to be given (step S316). Specifically, the operation instruction unit 106 compares the operation mode of each of the imaging devices 200B and 200C stored in the storage unit 104 to the operation mode of the imaging device 200A and specifies the imaging device 200C of which the operation mode matches.

Next, the information processing device 100-1 transmits a recording operation instruction to the imaging device 200C (step S318). Specifically, the operation instruction unit 106 generates an operation instruction to shift the process execution state to the state during recording and causes the communication unit 202 to transmit the generated operation instruction to the imaging device 200C.

Next, the imaging device 200C starts recording (step S320). Specifically, the operation control unit 204 sets the process execution state of the imaging device 200C to the state during recording based on the operation instruction received from the information processing device 100-1 by the communication unit 202 and causes the imaging unit 206 to start imaging.

Next, the imaging device 200C transmits the operation state information (step S322). Specifically, the operation control unit 204 causes the communication unit 202 to transmit the operation state information including the process execution state information in which the setting is changed to the information processing device 100-1.

Next, the information processing device 100-1 records the received operation state information (step S324). Specifically, the communication unit 102 causes the storage unit 104 to store the process execution state information included in the operation state information received from the imaging device 200C.

In this way, according to the first embodiment of the present disclosure, the information processing device 100-1 acquires the operation state information of the imaging devices 200 and gives the operation instruction to the specified imaging device 200 based on the acquired operation state information. Therefore, since the imaging device 200 to be controlled is automatically specified based on the operation state information of the imaging device 200 without the user performing a manipulation, it is possible to improve the convenience for the user.

2-3. Modification Examples of Embodiment

The first embodiment of the present disclosure has been described above. The embodiment is not limited to the above-described example. Hereinafter, first to fourth modification examples of the embodiment will be described.

First Modification Example

As the first modification example of the embodiment, the operation instruction unit 106 may not give the operation instruction to the imaging device 200 which does not operate normally. Specifically, when the operation instruction unit 106 causes the communication unit 102 to transmit the generated operation instruction, the operation instruction unit 106 specifies the imaging device 200 of which the operation mode is the operation mode related to the operation mode of the imaging device 200 of which the process execution state is changed and of which the process execution state is not an abnormal state. Then, the operation instruction unit 106 causes the communication unit 102 to transmit the generated operation instruction to the specified imaging device 200. For example, the abnormal state of the imaging device 200 can be a state in which a recording medium is not inserted.

Thus, according to the first modification example of the embodiment, the operation instruction unit 106 does not give the operation instruction to the imaging device 200 in the operation state of an abnormal operation. Therefore, by not performing communication or a process related to the operation instruction, it is possible to reduce a communication amount and a processing load.

Second Modification Example

Figure 6:
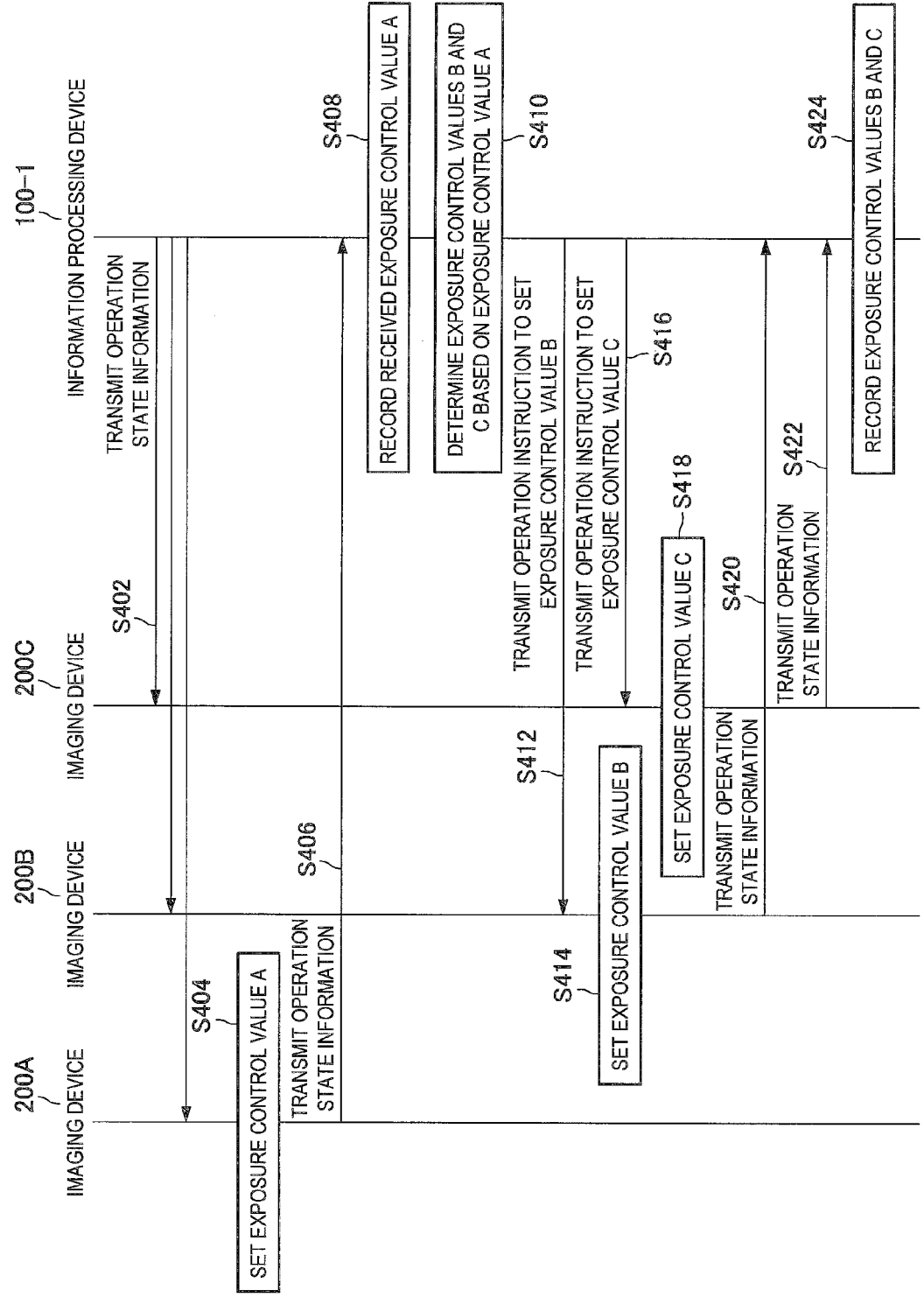
FIG. 6 is a sequence diagram conceptually illustrating processes of the information processing device and the imaging devices according to a second modification example of the first embodiment.

As a second modification example of the embodiment, the operation instruction may be an instruction to shift the operation state of the imaging device 200 different from the imaging device 200 of which the operation state is changed to an operation state different from the changed operation state of the imaging device 200 of which the operation state is changed. Specifically, the operation instruction unit 106 generates an instruction to shift the process execution state of the imaging device 200 different from the imaging device 200 of which the process execution state is changed to the process execution state different from the changed process execution state of the imaging device 200 of which the process execution state is changed. For example, an example in which different exposure control values are set in the plurality of imaging devices 200 in order to combine a plurality of images captured with the mutually different exposure control values in a correction process for overexposure or underexposure of the images obtained through imaging will be described as an example of the foregoing operation instruction with reference to FIG. 6. FIG. 6 is a sequence diagram conceptually illustrating processes of the information processing device 100-1 and the imaging devices 200 according to the second modification example of the embodiment.

The information processing device 100-1 first transmits an exposure control instruction to the imaging devices 200A to 200C (step S402). Specifically, the operation instruction unit 106 generates the exposure control instruction using an input or the like from another function of the information processing device 100-1 as a trigger and causes the communication unit 102 to transmit the exposure control instruction generated for the imaging devices 200A to 200C. For example, the other function of the information processing device 100-1 can be a user's manipulation detection function, any of variation sensors, or the like.

The imaging device 200A receiving the exposure control instruction from the information processing device 100-1 sets an exposure control value A (step S404). Specifically, the operation control unit 204 changes the exposure control value to the exposure control value A of the imaging device 200A and the imaging unit 206 performs imaging based on this exposure control value. For example, the exposure control value A can be 3EV (Exposure Value).

Next, the imaging device 200A transmits the operation state information to the information processing device 100-1 (step S406). Specifically, the operation control unit 204 causes the communication unit 202 to transmit the operation state information including the exposure control value A set in the information processing device 100-1.

The information processing device 100-1 receiving the exposure control value A from the imaging device 200A records the received operation state information (step S408). Specifically, the communication unit 102 causes the storage unit 104 to store the received exposure control value A.

Next, the information processing device 100-1 decides exposure control values B and C based on the exposure control value A. Specifically, the operation instruction unit 106 decides the exposure control values B and C as values different from the received exposure control value A. For example, the operation instruction unit 106 can decide 5EV and 13EV as the exposure control values B and C, respectively, while the exposure control value A is 3EV.

Next, the information processing device 100-1 transmits an operation instruction to set the exposure control value B for the imaging device 200B (step S412). Specifically, the operation instruction unit 106 generates the operation instruction to set B as the exposure control value and causes the communication unit 102 to transmit the operation instruction generated for the imaging device 200B.

The imaging device 200B receiving the operation instruction from the information processing device 100-1 sets the exposure control value B (step S414). Specifically, the operation control unit 204 sets B as the exposure control value of the imaging device 200 according to the received operation instruction and the imaging unit 206 performs imaging based on this exposure control value.

As in step S412, the information processing device 100-1 transmits an operation instruction to set the exposure control value C for the imaging device 200C (step S416).

As in step S414, the imaging device 200C receiving the operation instruction from the information processing device 100-1 sets the exposure control value C (step S418).

Next, the imaging device 200B transmits the operation state information to the information processing device 100-1 (step S420). Specifically, the operation control unit 204 causes the communication unit 202 to transmit the operation state information including the fact that that B is set as the exposure control value to the information processing device 100-1.

As in step S420, the imaging device 200C transmits the operation state information to the information processing device 100-1 (step S422).

The information processing device 100-1 receiving the operation state information from the imaging devices 200B and 200C records the exposure control values B and C (step S424). Specifically, when the operation state information including the fact that the exposure control values are set is received from the imaging devices 200B and 200C by the communication unit 102, the operation instruction unit 106 causes the storage unit 104 to store the exposure control values B and C.

Thus, according to the second modification example of the embodiment, the operation instruction generated by the operation instruction unit 106 is the operation instruction to shift the operation state of the imaging device 200 different from the imaging device 200 of which the operation state is changed to the operation state different from the changed operation state of the imaging device 200 of which the operation state is changed. Therefore, by giving the different operation instructions to the imaging devices 200, it is possible to perform more advanced cooperative control on the plurality of imaging devices 200.

Third Modification Example

As a third modification example of the embodiment, the operation instruction unit 106 may not give the operation instruction when the operation state of the imaging device 200 is changed due to operation abnormality. Specifically, when the process execution state included in the operation state information received from the imaging device 200 is shifted due to operation abnormality, the operation instruction unit 106 does not generate the operation instruction based on the change in the operation state information. For example, a state shifted due to operation abnormality can be a stopped state because the storage capacity of a recording medium reaches an upper limit.

Thus, according to the third modification example of the embodiment, the operation instruction unit 106 does not give the operation instruction when the operation state of the imaging device 200 is changed due to operation abnormality. Therefore, by not giving an operation instruction which is likely not to correspond to a user's intention, it is possible to improve the convenience for the user.

Fourth Modification Example

As a fourth modification example of the embodiment, the operation instruction unit 106 may perform an operation instruction for each group to which the imaging devices 200 belong. Specifically, the operation instruction unit 106 gives the operation instruction to the imaging device 200 which belongs to the group to which the imaging device 200 of which the operation state is changed belongs and is different from the imaging device 200 of which the operation state is changed. For example, an example in which the operation instruction is given inside the group of the imaging devices 200 will be described with reference to FIG. 7. FIG. 7 is a diagram for describing an example of an operation instruction given inside the group of the imaging devices 200 of the information processing device 100-1 according to the fourth modification example of the embodiment.

First, the information processing device 100-1 sets the groups to which the plurality of imaging devices 200 each belong. For example, as illustrated in the left drawing of FIG. 7, the operation instruction unit 106 can set imaging devices 200D and 200E in a group X and set imaging devices 200A to 200C in a group Y among the connected imaging devices 200A to 200E. For example, the user can perform setting such that the group X is a group to which the imaging devices 200 installed outdoors belong and the group Y is a group to which the imaging devices 200 installed indoors belong. The setting of the groups can be performed based on a user's manipulation or can be automatically performed based on a predetermined determination criterion stored in the storage unit 104.

Then, when the information processing device 100-1 receives the operation state information from the imaging device 200 of which the operation state is changed, the information processing device 100-1 performs a process related to the operation instruction on the other imaging devices 200 belonging to the group to which this imaging device 200 belongs. For example, when the operation state information is received from the imaging device 200D of which the process execution state is changed to the state during recording by the communication unit 102, the operation instruction unit 106 specifies the imaging device 200E belonging to the same group as the group to which the imaging device 200D belongs, among the connected imaging devices 200A to 200E. Then, the operation instruction unit 106 determines that the operation mode of the imaging device 200E is an operation mode related to the imaging device 200D and causes the communication unit 102 to transmit the operation instruction to the imaging device 200E, as illustrated in the right drawing of FIG. 7. Then, the process execution state of the imaging device 200E receiving the operation instruction can be shifted to the state during recording.

Thus, according to the fourth modification example of the embodiment, the operation instruction unit 106 gives the operation instruction for each group to which the imaging device 200 belongs. Therefore, by handling an operation instruction target in units of groups, the operation instruction can be given without designation of the individual imaging device 200. Further, the operation instruction unit 106 gives the operation instruction of the imaging device 200 which belongs to the group to which the imaging device 200 of which the operation state is changed belongs and is different from the imaging device 200 of which the operation state is changed. Therefore, by automatically giving the operation instruction to the imaging device 200 of the self-group without the user performing a manipulation or the like of setting an operation instruction target range, it is possible to improve the convenience.

The operation instruction unit 106 may give the operation instruction to the imaging device 200 which belongs to the group different from the group to which the imaging device 200 of which the operation state is changed belongs. For example, an example in which the operation instruction is given across the groups of the imaging devices 200 will be described with reference to FIG. 8. FIG. 8 is a diagram for describing an example of an operation instruction performed across groups of the imaging devices 200 of the information processing device 100-1 according to a fourth modification example of the first embodiment.

The information processing device 100-1 first sets the groups to which the plurality of imaging devices 200 each belong. Since the details are substantially the same as those of the operation instruction given inside the group, the description thereof will be omitted.

When the information processing device 100-1 receives the operation state information from the imaging device 200 of which the operation state is changed, the information processing device 100-1 performs a process related to the operation instruction on the imaging device 200 which belongs to the group different from the group to which the imaging device 200 belongs. For example, when the operation state information is received from the imaging device 200D of which the process execution state is changed to the state during recording by the communication unit 102, the operation instruction unit 106 specifies the imaging devices 200A and 200C which belong to the group different from the group to which the imaging device 200D belongs, among the connected imaging devices 200A to 200E. Then, the operation instruction unit 106 determines that the operation mode of each of the imaging devices 200A to 200C is an operation mode related to the imaging device 200D and causes the communication unit 102 to transmit the operation instruction to the imaging devices 200A to 200C, as illustrated in the right drawing of FIG. 8. Then, the process execution state of each of the imaging devices 200A to 200C receiving the operation instruction can be shifted to the state during recording.

Thus, the operation instruction unit 106 gives the operation instruction to the imaging devices 200 which belong to the group different from the group to which the imaging device 200 of which the operation state is changed belongs. Therefore, by automatically giving the operation instruction of the imaging devices 200 of another group without the user performing a manipulation or the like of setting an operation instruction target range, it is possible to improve the convenience.

The example in which the operation instruction unit 106 gives the operation instruction to the group different from the group to which the imaging device 200 of which the operation state is changed belongs has been described above. However, the operation instruction unit 106 may give the operation instruction to the group satisfying a predetermined condition among the groups different from the group to which the imaging device 200 of which the operation state is changed belongs. For example, the predetermined condition can be defined by the user. In this case, by selecting the group in which the operation instruction is given, it is possible to meet detailed needs of the user.

3. SECOND EMBODIMENT OF THE PRESENT DISCLOSURE

Example in which Imaging Device Serving as Starting Point of Operation Instruction is Set The information processing device 100-1 according to the first embodiment of the present disclosure has been described above. Next, an information processing device 100-2 according to the second embodiment of the present disclosure will be described. The information processing device 100-2 according to the embodiment performs setting of an imaging device 200 (hereinafter also referred to as imaging devices 200 serving as a starting point of an operation instruction) related to a change in the operation state triggering execution of the operation instruction.

Figure 9:
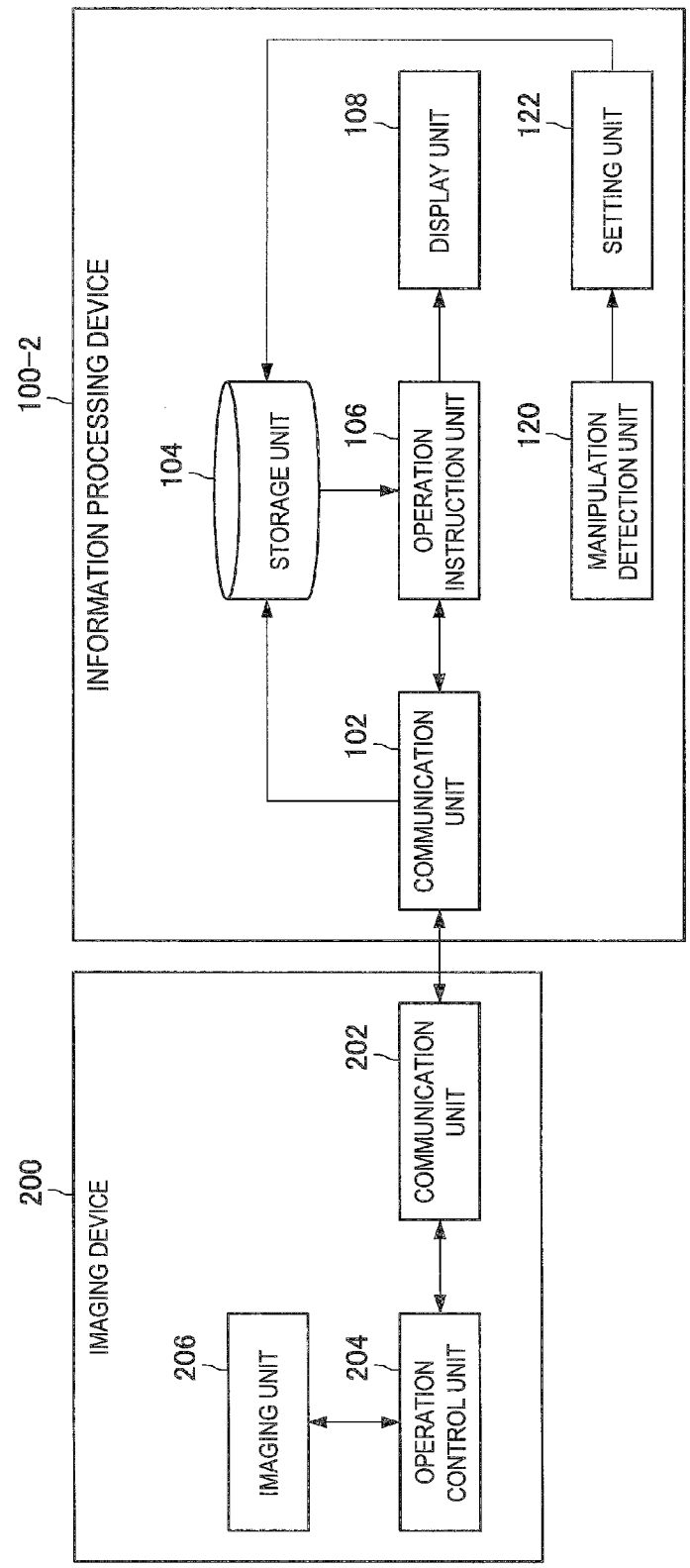
FIG. 9 is a block diagram illustrating overall functional configurations of the information processing device and the imaging device according to a second embodiment of the present disclosure.

3-1. Configuration of Information Processing Device According to Embodiment First, the configurations of the information processing device 100-2 and the imaging device 200 according to the second embodiment of the present disclosure will be described with reference to FIG. 9. FIG. 9 is a block diagram illustrating overall functional configurations of the information processing device 100-2 and the imaging device 200 according to a second embodiment of the present disclosure.

As illustrated in FIG. 9, the information processing device 100-2 includes a manipulation detection unit 120 and a setting unit 122 in addition to a communication unit 102, a storage unit 104, an operation instruction unit 106, and a display unit 108.

The manipulation detection unit 120 detects a manipulation of selecting the imaging device 200 serving as the starting point of the operation instruction. Specifically, the manipulation detection unit 120 detects a manipulation of selecting the imaging device 200 serving as the starting point of the operation instruction based on a user's manipulation on a manipulation unit included in the information processing device 100-2. For example, a user's manipulation can be a selection manipulation by pressing up and down keys or a selection manipulation by a touch manipulation performed on a touch panel or the like.

The setting unit 122 sets the imaging device 200 for which the selection manipulation is detected by the manipulation detection unit 120 as the imaging device 200 serving as the starting point of the operation instruction. Specifically, the setting unit 122 sets the imaging device 200 specified based on the selection manipulation detected by the manipulation detection unit 120 as the imaging device 200 serving as the starting point of the operation instruction and causes the storage unit 104 to store the setting.

The operation instruction unit 106 gives an operation instruction when the imaging device 200 of which the operation state is changed is the imaging device 200 serving as the starting point of the operation instruction. Specifically, when the operation state is determined to be changed based on the operation state information received by the communication unit 102 and the operation state information stored in the storage unit 104, the operation instruction unit 106 acquires the imaging device 200 serving as the starting point of the operation instruction from the storage unit 104 and determines whether the imaging device 200 related to the received operation state information is set as the acquired imaging device 200. When the operation instruction unit 106 determines that the imaging device 200 related to the received operation state information is set as the acquired imaging device 200, the operation instruction unit 106 performs a process of the operation instruction.

The display unit 108 displays an image or the like related to the manipulation of selecting the imaging device 200. For example, the display unit 108 can acquire a list of the connected imaging devices 200 through the communication unit 102, acquire the setting which is the setting stored in the storage unit 104 and is the setting of the imaging device 200 serving as the starting point of the operation instruction, and display a selection screen of the imaging device 200 serving as the starting point of the operation instruction. Further, the display unit 108 can update the selection screen according to a selection manipulation detected by the manipulation detection unit 120.

3-2. Process of Information Processing Device According to Embodiment

Figure 10:
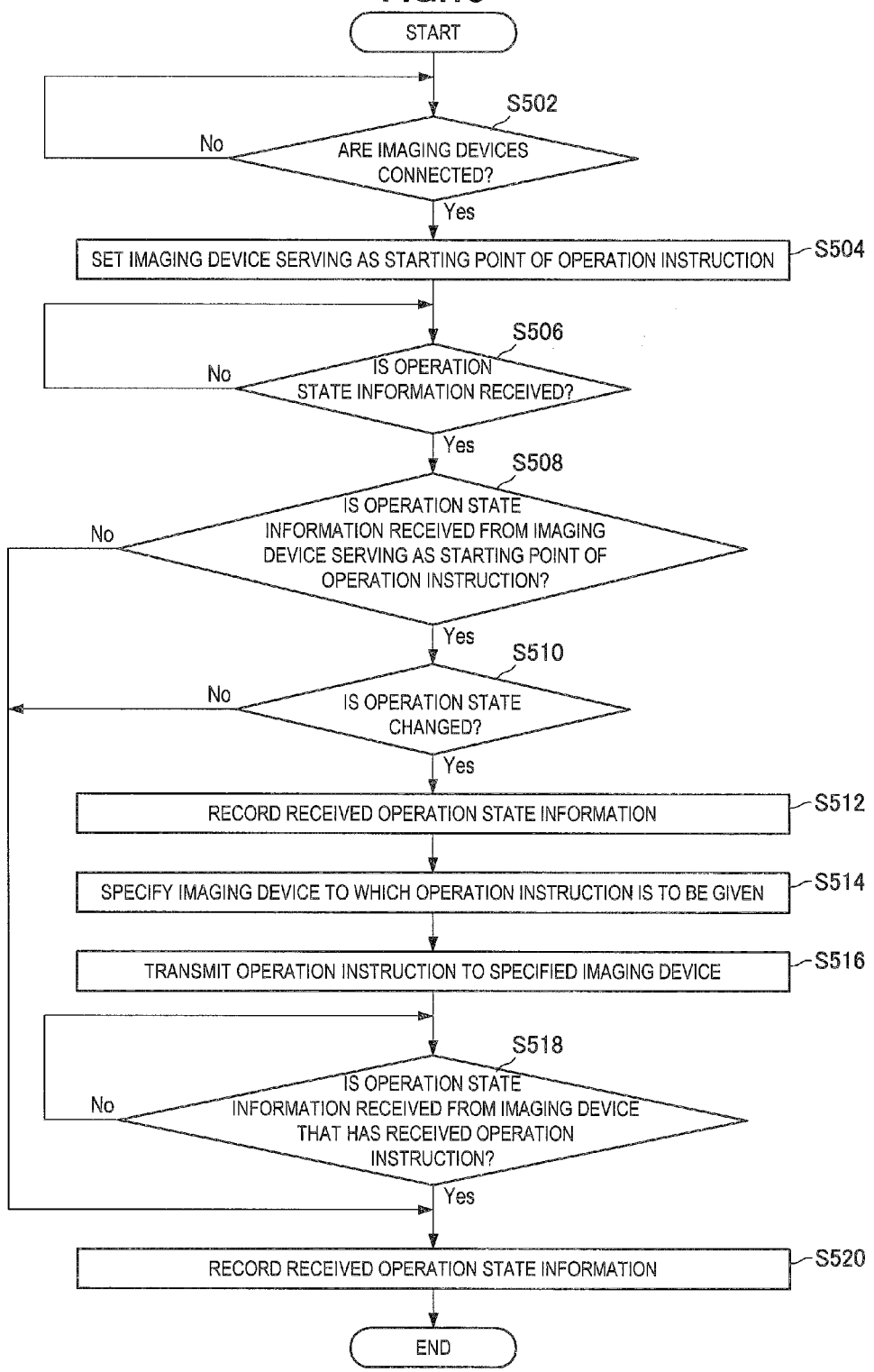
FIG. 10 is a flowchart conceptually illustrating a process of the information processing device according to the second embodiment.

Next, the process of the information processing device 100-2 according to the embodiment will be described with reference to FIG. 10. FIG. 10 is a flowchart conceptually illustrating a process of the information processing device 100-2 according to the embodiment.

First, the information processing device 100-2 waits until the imaging devices 200 are connected (step S502). When the imaging devices 200 are connected in step S502, the information processing device 100-2 sets the imaging device serving as the starting point of the operation instruction (step S504). Specifically, when communication connection with the imaging devices 200 is established by the communication unit 102, the display unit 108 displays the list of the connected imaging devices 200. Then, the setting unit 122 sets the imaging device 200 specified based on a user's selection manipulation detected by the manipulation detection unit 120 as the imaging device 200 serving as the starting point of the operation instruction. Further, the setting unit 122 causes the storage unit 104 to store the setting content.

Next, the information processing device 100-2 waits until the operation state information is received (step S506). When the operation state information is received in step S506, the information processing device 100-2 determines whether the operation state information is received from the imaging device 200 serving as the starting point of the operation instruction (step S508). Specifically, when the operation state information of the imaging devices 200 is received by the communication unit 102, the operation instruction unit 106 determines whether the imaging device 200 which is a transmission source of the received operation state information is set as the imaging device 200 serving as the starting point of the operation instruction based on the setting stored in the storage unit 104.

When it is determined in step S508 that the operation state information is received from the imaging device 200 serving as the starting point of the operation instruction, the information processing device 100-2 determines whether the operation state is changed (step S510). Since the details are substantially the same as those of the process of step S314 of the process flowchart in the information processing device 100-1 according to the first embodiment, the description thereof will be omitted.

When it is determined in step S510 that the operation state is changed, the information processing device 100-2 records the received operation state information (step S512). Since the details are substantially the same as those of the process of step S308 or the like of the process flowchart in the information processing device 100-1 according to the first embodiment, the description thereof will be omitted.

Next, the information processing device 100-2 specifies the imaging devices 200 to which the operation instruction is to be given (step S514). Since the details are substantially the same as those of the process of step S316 or the like of the process flowchart in the information processing device 100-1 according to the first embodiment, the description thereof will be omitted.

Next, the information processing device 100-2 transmits the operation instruction to the specified imaging devices 200 (step S516).

Next, the information processing device 100-2 waits until the operation state information is received from the imaging devices 200 to which the operation instruction has been transmitted (step S518).

When the operation state information is received from the imaging device 200 transmitting the operation instruction in step S518, the information processing device 100-2 records the received operation state information (step S520).

Thus, according to the second embodiment of the present disclosure, the information processing device 100-2 sets the imaging device 200 serving as the starting point of the operation instruction based on the user's manipulation or the like and gives the operation instruction using the change in the operation state of the set imaging device 200 as a trigger. Therefore, by specifying the imaging device 200 serving as the starting point of the operation instruction, it is possible to suppress occurrence of a user's unintended operation instruction. For example, by not setting the imaging device 200 installed at a position at which an impact is easily received by the user as the imaging device 200 serving as the starting point of the operation instruction, it is possible to prevent the influence of an erroneous operation or the like due to the impact from reaching the other imaging devices 200. Further, when the plurality of imaging devices 200 are manipulated by a plurality of persons, the imaging device 200 of the person having imaging authority is set as the imaging device 200 serving as the starting point of the operation instruction and the setting is not performed on the imaging devices 200 of the other persons, and thus imaging start, stop, and the like of all of the imaging devices 200 can be performed based on a manipulation of the person having the imaging authority.

In the foregoing example, the example in which the imaging device 200 serving as the starting point of the operation instruction is set by a user's manipulation has been described, but this setting may be performed automatically. For example, the setting unit 122 can acquire the kinds of imaging devices 200 from the imaging devices 200 and set a predetermined kind of imaging device 200 as the imaging device 200 serving as the starting point of the operation instruction. In this case, it is possible to omit the setting manipulation by the user.

3-3. Modification Examples of Embodiment

The second embodiment of the present disclosure has been described above. The embodiment is not limited to the above-described examples. Hereinafter, a modification example of the embodiment will be described.

As the modification example of the embodiment, the setting unit 122 may set the imaging device 200 serving as the starting point of the operation instruction in units of groups to which the imaging devices 200 belong. Specifically, when a group selection manipulation is performed, the setting unit 122 sets the imaging device 200 belonging to the group on which the selection manipulation is performed as the imaging device 200 serving as the starting point of the operation instruction. For example, when the manipulation detection unit 120 detects that a group selection manipulation is performed on a setting screen or the like of the imaging device 200 serving as the starting point of the operation instruction, the setting unit 122 sets each of the imaging devices 200 belonging to the group on which the selection manipulation is performed as the imaging device 200 serving as the starting point of the operation instruction and causes the storage unit 104 to store the setting. The setting of the group to which the imaging devices 200 belong can be performed in advance through a user's manipulation or the like and can be stored in the storage unit 104.

Thus, according to the modification example of the embodiment, the setting unit 122 sets the imaging device 200 serving as the starting point of the operation instruction in the units of groups to which the imaging devices 200 belong. Therefore, the user does not have to set the individual imaging devices 200, and thus it is possible to improve the convenience for the user.

4. HARDWARE CONFIGURATION OF INFORMATION PROCESSING DEVICE ACCORDING TO EMBODIMENT OF THE PRESENT DISCLOSURE

The embodiments of the present disclosure have been described above. The processes of the information processing device 100 described above are realized through cooperation of software and the hardware of the information processing device 100 to be described below.

Figure 11:
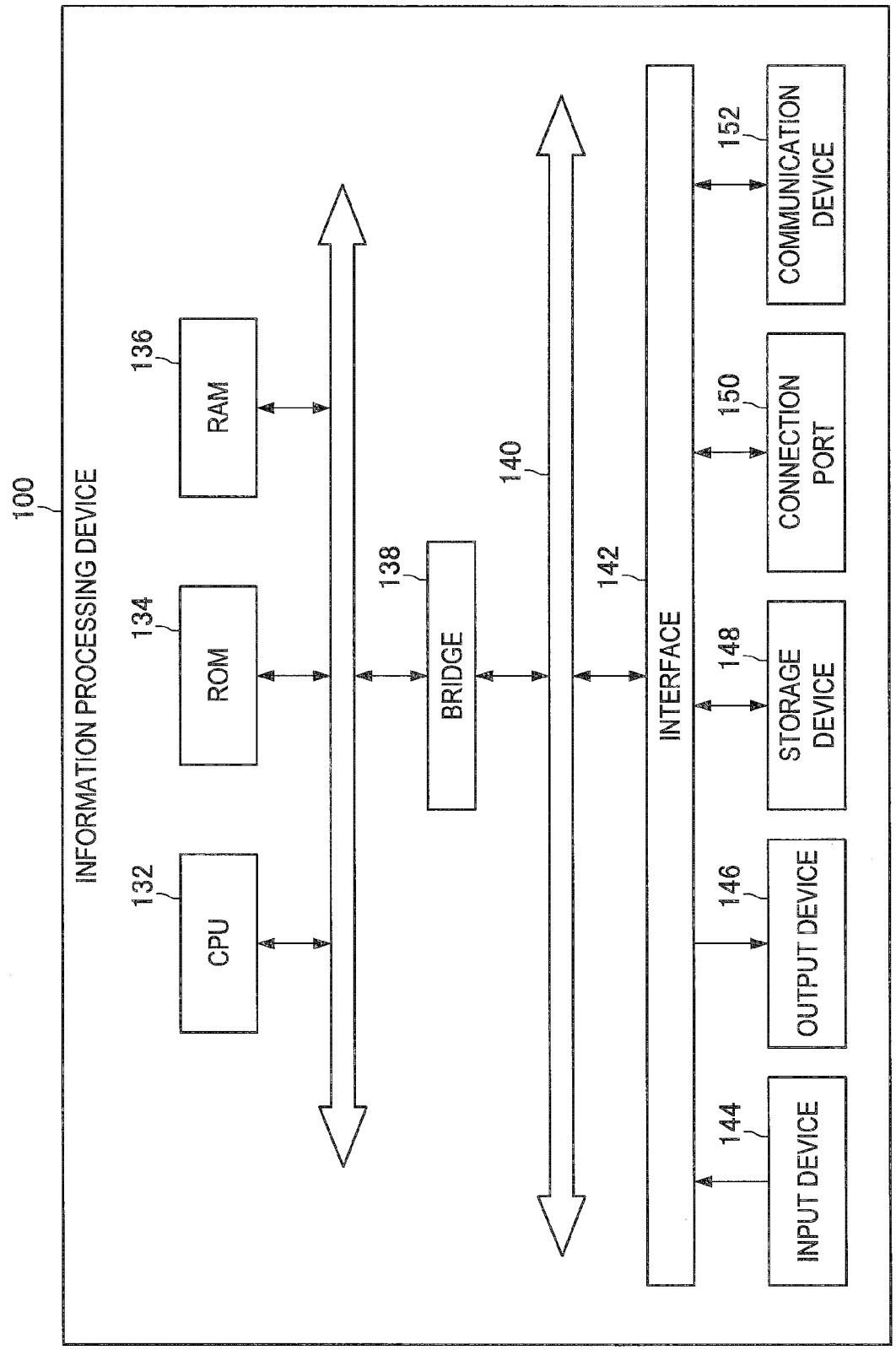
FIG. 11 is an explanatory diagram illustrating a hardware configuration of the information processing device according to an embodiment of the present disclosure.

FIG. 11 is an explanatory diagram illustrating a hardware configuration of the information processing device 100 according to an embodiment of the present disclosure. As illustrated in FIG. 11, the information processing device 100 includes a central processing unit (CPU) 132, a read-only memory (ROM) 134, a random access memory (RAM) 136, a bridge 138, a bus 140, an interface 142, an input device 144, an output device 146, a storage device 148, a connection port 150, and a communication device 152.

The CPU 132 functions as an arithmetic processing device and a control device and realizes an operation of the operation instruction unit 106, a manipulation detection unit 120, and the setting unit 122 in the information processing device 100 in cooperation with various programs. The CPU 132 may be a microprocessor. The ROM 134 stores programs, arithmetic parameters, and the like used by the CPU 132. The RAM 136 temporarily stores programs used in execution of the CPU 132 or parameters or the like properly changed in execution thereof. A part of the storage unit 104 in the information processing device 100 is realized by the ROM 134 and the RAM 136. The CPU 132, the ROM 134, and the RAM 136 are mutually connected by an internal bus configured by a CPU bus or the like.

The input device 144 is configured to include an input unit, such as a mouse, a keyboard, a touch panel, a button, a microphone, a switch, and a lever, used for the user to input information and an input control circuit generating an input signal based on an input by the user and outputting the input signal to the CPU 132. The user of the information processing device 100 can input various kinds of data or can give an instruction of a processing operation to the information processing device 100 by manipulating the input device 144.

The output device 146 is an example of the display unit 108 of the information processing device 100 and outputs information to, for example, a device such as a liquid crystal display (LCD) device, an organic light emitting diode (OLED) device, or a lamp. The output device 146 may output an audio of a speaker, a headphone, and the like.

The storage device 148 is a device that stores data. The storage device 148 may include a storage medium, a recording device recording data on a storage medium, a reading device reading data from a storage medium, or a deletion device deleting data recorded on a storage medium. The storage device 148 stores programs executed by the CPU 132 or various kinds of data.

The connection port 150 is, for example, a bus connected to an external information processing process or a peripheral device of the information processing device 100. The connection port 150 may be a Universal Serial Bus (USB).

The communication device 152 is an example of the communication unit 102 of the information processing device 100 and is, for example, a communication interface configured by a communication device connected to a network. The communication device 152 may be a device corresponding to infrared communication, may be a communication device corresponding to a wireless local area network (LAN), may be a communication device corresponding to Long Term Evolution (LTE), or may be a wired communication device performing communication in a wired manner.

5. CONCLUSION

According to the first embodiment of the present disclosure, since the imaging device 200 to be controlled is automatically specified based on the operation state of the imaging device 200 without the user performing a manipulation, it is possible to improve convenience for the user. Further, according to the second embodiment of the present disclosure, by specifying the imaging device 200 serving as the starting point of the operation instruction, it is possible to suppress occurrence of an unintended operation instruction of the user.

The preferred embodiments of the present disclosure have been described in detail with reference to the appended drawings, but the technical scope of the present disclosure is not limited to the examples. It should be understood by those skilled in the art that various modifications, combinations, sub-combinations and alterations may occur depending on design requirements and other factors insofar as they are within the scope of the appended claims or the equivalents thereof.

For example, in the foregoing embodiments, the information processing device 100 has been described as the portable communication terminal, but the present technology is not limited to this example. For example, the information processing device 100 may be realized as the imaging device 200. In this case, by realizing the operation of the information processing device 100 utilizing the functions of the imaging device 200, it is possible to reduce cost.

The advantageous effects described in the present specification are merely descriptive and exemplary, and thus are not restrictive. That is, according to an embodiment of the technology related to the present disclosure, it is possible to obtain other advantageous effects apparent those skilled in the art along with the foregoing advantageous effects or instead of the foregoing advantageous effects from the description of the present specification.

Additionally, the present technology may also be configured as below:

(1) An information processing device including:

an acquisition unit configured to acquire operation state information of connected imaging devices; and an operation instruction unit configured to give an operation instruction to the imaging device specified based on the operation state information of the imaging devices acquired by the acquisition unit.

(2) The information processing device according to (1), wherein the operation state information includes information indicating an operation mode, and wherein the operation instruction unit gives the operation instruction to the imaging device in an operation mode related to the operation mode indicated by the acquired operation state information of the imaging device.

(3) The information processing device according to (2), wherein the operation instruction unit does not give the operation instruction to the imaging device in an operation state of an abnormal operation.

(4) The information processing device according to any one of (1) to (3), wherein the operation instruction unit gives the operation instruction using a change in an operation state of the imaging device acquired by the acquisition unit as a trigger.

(5) The information processing device according to (4), wherein the operation instruction includes an instruction to shift the operation state of the imaging device different from the imaging device related to the change to the changed operation state of the imaging device related to the change.

(6) The information processing device according to (4) or (5), wherein the operation instruction includes an instruction to shift the operation state of the imaging device different from the imaging device related to the change to an operation state different from the changed operation state of the imaging device related to the change.

(7) The information processing device according to any one of (4) to (6), wherein the operation instruction unit does not give the operation instruction when the operation state of the imaging device is changed due to operation abnormality.

(8) The information processing device according to any one of (4) to (7), further including:
a setting unit configured to set the imaging device related to the change triggering execution of the operation instruction,
wherein the operation instruction unit gives the operation instruction using the change in the operation state of the imaging device set by the setting unit as a trigger.

(9) The information processing device according to any one of (4) to (8), wherein the operation instruction unit gives the operation instruction for each group to which the imaging device belongs.

(10) The information processing device according to (9), wherein the operation instruction unit gives the operation instruction to the imaging device which belongs to the group to which the imaging device of which the operation state is changed belongs and is different from the imaging device of which the operation state is changed.

(11) The information processing device according to any one of (1) to (10), wherein the information processing device is the imaging device.

(12) An information processing system including:
imaging devices each configured to include
an imaging unit, and
a communication unit that transmits operation state information; and
an information processing device configured to include
a communication unit that receives the operation state information of the connected imaging devices, and
an operation instruction unit that gives an operation instruction, through the communication unit, to the imaging device specified based on the operation state information of the imaging devices received by the communication unit,
wherein the imaging device controls the imaging unit based on the operation instruction from the information processing device.

(13) An information processing method including:
acquiring operation state information of connected imaging devices; and
giving an operation instruction to the imaging device specified based on the acquired operation state information of the imaging devices.

(14) A program causing a computer to realize:
an acquisition function of acquiring operation state information of connected imaging devices; and
an operation instruction function of giving an operation instruction to the imaging device specified based on the operation state information of the imaging devices acquired by the acquisition function.

What is claimed is:
1. An information processing device, comprising:
one or more processors configured to:
store operation state information of each of a first plurality of imaging devices, wherein the operation state information includes an operation mode and a process execution state;
detect a change in a first process execution state of a first imaging device of the first plurality of imaging devices, from a first state to a second state,
determine a second plurality of imaging devices from the first plurality of imaging devices, based on the detected change in the first process execution state, wherein each of the second plurality of imaging devices has a second operation mode same as a first operation mode of the first imaging device;
compare a second process execution state of each of the second plurality of imaging devices, with the first process execution state of the first imaging device;
determine at least one second imaging device of the second plurality of imaging devices that has a third process execution state same as the first state, based on the comparison of the second process execution state;
generate at least one operation instruction to change the third process execution state of the at least one second imaging device, based on the determination of the at least one second imaging device; and
transmit the at least one operation instruction to the at least one second imaging device.

2. The information processing device according to claim 1, wherein the at least one operation instruction includes an instruction to change the third process execution state of the at least one second imaging device to the second state.

3. The information processing device according to claim 1, wherein the at least one operation instruction includes an instruction to change the third process execution state of the at least one second imaging device to a third state different from the second state of the first imaging device.

4. The information processing device according to claim 1, wherein the change in the first process execution state of the first imaging device is based on a storage capacity of the first imaging device that is greater than a threshold.

5. The information processing device according to claim 1, wherein the one or more processors are further configured to:
set the change in the first process execution state of the first imaging device as a trigger; and
generate the at least one operation instruction based on the change in the first process execution state of the first imaging device set as the trigger.

6. The information processing device according to claim 1, wherein the one or more processors are further configured to generate the at least one operation instruction for each group of a plurality of groups that include the first plurality of imaging devices.

7. The information processing device according to claim 6, wherein the at least one second imaging device belongs to at least one same group that includes the first imaging device.

8. The information processing device according to claim 1, wherein the first plurality of imaging devices include the information processing device.

9. The information processing device according to claim 1, wherein the one or more processors are further configured to generate the at least one operation instruction based on a storage capacity of the at least one second imaging device.

10. The information processing device according to claim 1, wherein the one or more processors are further configured to prevent transmission of the at least one operation instruction to the at least one second imaging device based on a lack of a recording medium in the at least one second imaging device.

11. An information processing system, comprising:
a first plurality of imaging devices each comprising one or more processors configured to transmit operation state information, wherein the operation state information includes an operation mode and a process execution state; and
an information processing device comprising one or more processors configured to:
receive the operation state information of each of the first plurality of imaging devices;
detect a change in a first process execution state of a first imaging device of the first plurality of imaging devices, from a first state to a second state;
determine a second plurality of imaging devices from the first plurality of imaging devices, based on the detected change in the first process execution state, wherein each of the second plurality of imaging devices has a second operation mode same as a first operation mode of the first imaging device;
compare a second process execution state of each of the second plurality of imaging devices with the first process execution state of the first imaging device;
determine at least one second imaging device of the second plurality of imaging devices that has a third process execution state same as the first state, based on the comparison of the second process execution state;
generate at least one operation instruction to change the third process execution state of the at least one second imaging device, based on the determination of the at least one second imaging device; and
transmit the at least one operation instruction to the at least one second imaging device.

12. An information processing method, comprising:
in an information processing device:
storing operation state information of each of a first plurality of imaging devices, wherein the operation state information includes an operation mode and a process execution state;
detecting a change in a first process execution state of a first imaging device of the first plurality of imaging devices, from a first state to a second state;
determining a second plurality of imaging devices from the first plurality of imaging devices, based on the detected change in the first process execution state, wherein each of the second plurality of imaging devices has a second operation mode same as a first operation mode of the first imaging device;
comparing a second process execution state of each of the second plurality of imaging devices, with the first process execution state of the first imaging device;
determining at least one second imaging device of the second plurality of imaging devices that has a third process execution state same as the first state, based on the comparison of the second process execution state;
generating at least one operation instruction to change the third process execution state of the at least one second imaging device, based on the determination of the at least one second imaging device; and
transmitting the at least one operation instruction to the at least one second imaging device.

13. The information processing method according to claim 12, wherein the at least one operation instruction includes an instruction to change the third process execution state of the at least one second imaging device to the second state.

14. The information processing method according to claim 12, wherein the at least one operation instruction includes an instruction to change the third process execution state of the at least one second imaging device to a third state different from the second state of the first imaging device.

15. The information processing method according to claim 12, further comprising:
setting the change in the first process execution state of the first imaging device as a trigger; and
generating the at least one operation instruction based on the change in the first process execution state of the first imaging device set as the trigger.

16. A non-transitory computer-readable medium having stored thereon computer-readable instructions for causing a computer to execute operations, the operations comprising:
storing operation state information of each of a first plurality of imaging devices, wherein the operation state information includes an operation mode and a process execution state;
detecting a change in a first process execution state of a first imaging device of the first plurality of imaging devices, from a first state to a second state;
determining a second plurality of imaging devices from the first plurality of imaging devices, based on the detected change in the first process execution state, wherein each of the second plurality of imaging devices has a second operation mode same as a first operation mode of the first imaging device;
comparing a second process execution state of each of the second plurality of imaging devices with the first process execution state of the first imaging device;
determining at least one second imaging device of the second plurality of imaging devices that has a third process execution state same as the first state, based on the comparison of the second process execution state;
generating at least one operation instruction to change the third process execution state of the at least one second imaging device, based on the determination of the at least one second imaging device; and
transmitting the at least one operation instruction to the at least one second imaging device.

* * * * *